United States Patent [19]

Bair et al.

[11] Patent Number: 5,383,539
[45] Date of Patent: Jan. 24, 1995

[54] BRAKE SQUEAL DAMPENER RING

[75] Inventors: John J. Bair, Plainwell; Steven W. Woodard, White Lake, both of Mich.

[73] Assignee: Eaton Corporation, Cleveland, Ohio

[21] Appl. No.: 131,350

[22] Filed: Oct. 4, 1993

[51] Int. Cl.⁶ .......................................... F16D 65/10
[52] U.S. Cl. ............................. 188/218 R; 301/6.1
[58] Field of Search ................... 188/218 R, 218 A; 301/6.1, 6.91; 267/161, 163, 164, 165

[56] References Cited

U.S. PATENT DOCUMENTS

| | | | |
|---|---|---|---|
| 1,791,495 | 2/1931 | Frey . | |
| 1,801,712 | 4/1931 | Barrett et al. . | |
| 2,197,583 | 4/1940 | Koeppen et al. | 301/6 |
| 2,349,658 | 5/1944 | Horn | 188/218 |
| 2,489,522 | 11/1949 | Chase | 188/218 |
| 2,588,665 | 3/1952 | Sinclair | 188/218 |
| 2,639,195 | 5/1953 | Bock | 301/6 |
| 2,726,741 | 12/1955 | Lyon | 188/218 R X |
| 2,759,572 | 8/1956 | Lyon | 188/218 R X |
| 2,808,908 | 10/1957 | Lyon | 188/218 R X |
| 2,808,910 | 10/1957 | Lyon | 188/218 R X |
| 2,962,324 | 11/1960 | Swanberg | 301/6 |
| 3,163,469 | 12/1964 | Huhtala | 301/6 |
| 4,635,882 | 1/1987 | SenGupta et al. | 244/119 |

Primary Examiner—Robert J. Oberleitner
Assistant Examiner—Kevin D. Rutherford
Attorney, Agent, or Firm—Loren H. Uthoff

[57] ABSTRACT

A device for reducing the level of brake squeal noise having a damper ring disposed between a brake drum and a vehicle wheel rim where one or more friction springs extend from a retention band to form the damper ring with its axial position relative to the wheel set by a stop flange attached to the retention band and where the friction springs contact the squealer band of the brake drum with a separation force thereby creating friction damping on the squealer band to lower vibration and resultant noise levels produced by the brake drum.

5 Claims, 2 Drawing Sheets

BRAKE SQUEAL DAMPENER RING

RELATED APPLICATION

This application is related to U.S. application Ser. No. 08/131,163 and U.S. Ser. No. 08/130,815 entitled "Brake Squeal Spring Clip Dampener" and "Drum Brake Spring Clip With Squealer Band Retainer" respectively, both assigned to the same assignee, Easton Corporation, as this application and filed the same date Oct. 4, 1993 as this application.

FIELD OF THE INVENTION

This invention relates to a device to reduce brake squeal. More specifically, the present invention relates to a device to reduce brake squeal by introducing a damping force between the wheel and brake squealer retention band using a damper ring incorporating at least one friction spring.

BACKGROUND OF THE INVENTION

Brake squeal occurs upon application of a vehicle brake when the structure of the brake drum resonates at its natural frequencies due to forces imparted by the brake pad frictionally engaging the inner surface of the brake drum. The sound pressure level produced by the vibrating drum can become objectionable to receivers in the immediate area thereby prompting manufacturers of brake drums and driveline systems to modify the brake drums using various means. The resulting reduced amplitudes of vibration reduce the sound level produced when brake squeal occurs.

Prior art methods of reducing the vibrational amplitude of a brake drum have included adding various additional structures such as retention bands and/or damping layers to the outside of the drum with varying degrees of effectiveness. The problem with these prior art approaches generally has been the complexity and expense introduced where the cost benefit ratio has not proved to be practical. Another significant problem introduced whenever a layer of material is added to the outside structure of the brake drum is that the rate of heat rejection is dramatically reduced, thereby reducing the service life of the drum. Examples of these prior art methods can be found by reference to U.S. Pat. Nos. 2,349,658 and 2,639,195, the disclosures of which are hereby incorporated by reference.

SUMMARY OF THE INVENTION

The present invention reduces the amplitude of vibration of the brake drum by providing frictional damping at the brake drum squealer band by inserting the damper ring of the present invention between the vehicle wheel and the inner edge of the brake drum. The frictional damping is produced by a separation force induced by one or more friction spring segments attached to a retention band which is positioned on the inside surface of the wheel rim. The pressure and relative motion of one end of the friction spring segments against the squealer band produces frictional damping and a resultant substantial reduction in brake squeal noise. By introducing both a separation force and a level of frictional damping, the vibrational amplitude of the squealer band at the inner edge of the brake drum is reduced thereby reducing the level of brake squeal noise upon brake application.

One provision of the present invention is to introduce a degree of frictional damping at the brake drum.

Another provision of the present invention is to introduce a degree of frictional damping at the brake drum utilizing a friction spring.

Still another provision of the present invention is to introduce a separation force and frictional damping between the vehicle wheel and brake drum using at least one steel spring preferably in the form of a leaf spring extending from a retention band which engages the wheel of the vehicle where the leaf spring extends and is forced against the squealer band section of the brake drum.

DETAILED DESCRIPTION OF THE PREFERRED EMBODIMENTS

Figure 1:
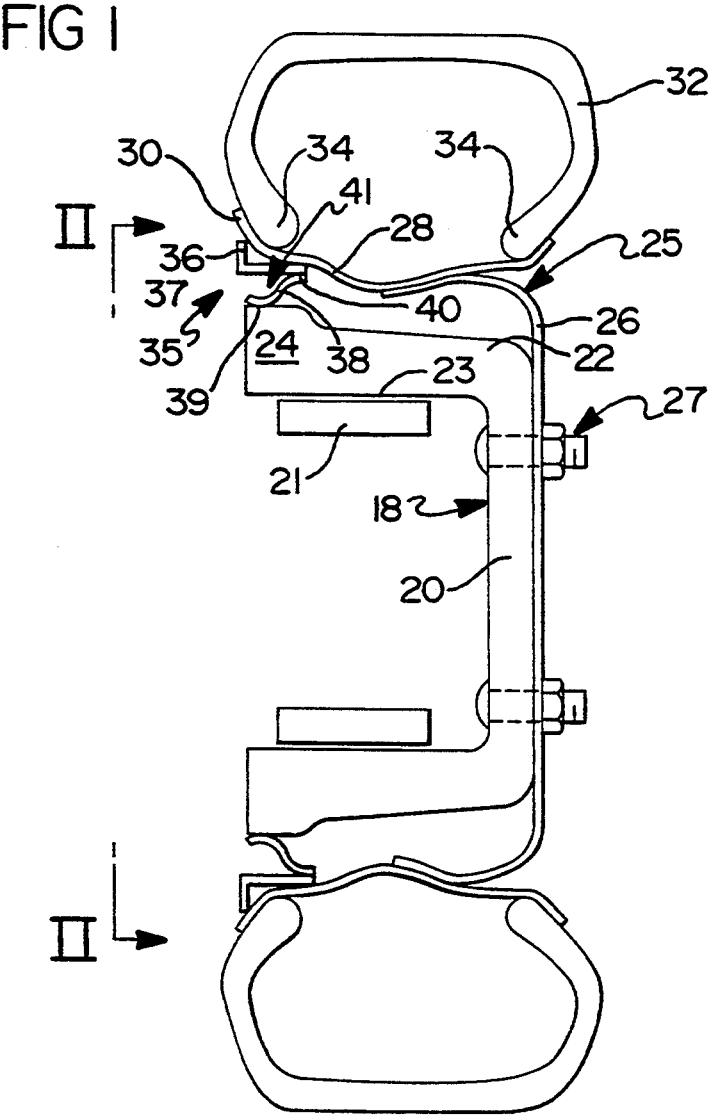
FIG. 1 is a cross-sectional view of the brake squeal damper ring of the present invention mounted between a wheel and brake drum.

Referring to FIG. 1, a cross-sectional view of a brake drum 18 is shown consisting of a flange 20 which supports a drum 22 which in turn forms the friction surface 23 which reacts against brake shoe 21. Formed at the opposite edge of the drum 22 as the flange 20 is a squealer band 24 which functions to reduce the vibration level of the brake drum assembly 18 induced by braking action which sometimes causes a high frequency squeal to be generated in the brake drum 18. The squealer band 24 serves to reduce the amplitude of the high frequency squeal thereby reducing overall noise level.

The wheel assembly 25 consists of a wheel hub 26 which is secured to a vehicle axle (not shown) by mounting bolts 27 where the flange 20 is sandwiched between the wheel hub 26 and a flange found on the vehicle axle. The wheel hub 26 is in turn secured to and supports the rim 28 where at both edges of the rim 28 are formed bead sections 30 which support the tire beads 34 of the tire 32.

According to the present invention, to further reduce the amplitude of the brake squeal noise generated when the friction surface 23 is acted upon by the brake shoe 21, the damper ring 35 of the present invention is fitted between the wheel rim 28 and the squealer band 24 so as to introduce a separation force between the two and frictional damping on the squealer band 24. The damper ring 35 consists of a retention band 37 and a plurality of friction spring segments 38 which are attached and function as part of the retention band 37 at connection joint 40.

Figure 3:
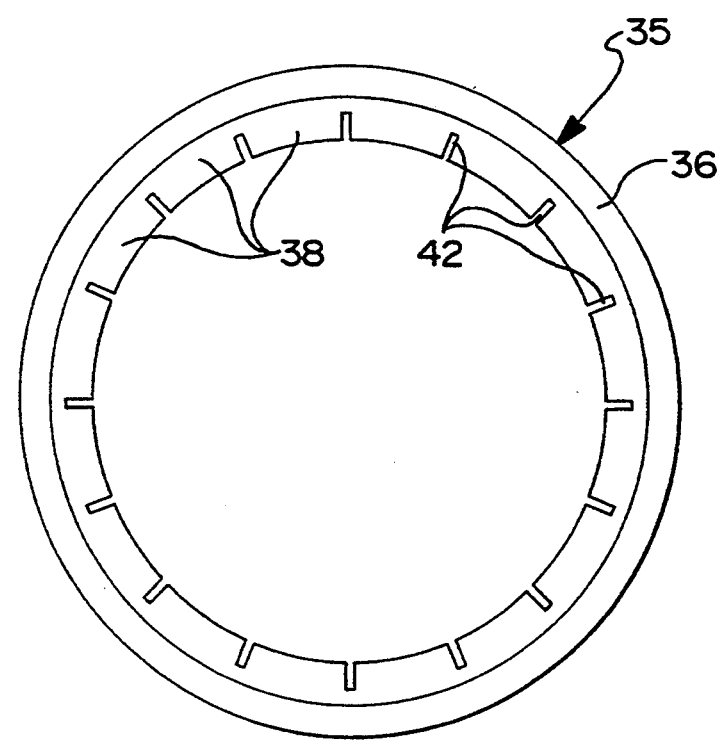
FIG. 3 is a front elevation view of an alternate embodiment of the damper ring of the present invention.

The friction spring segments 38 can take on a variety of shapes as compared to that shown in the preferred embodiment in FIG. 1. In addition to a variety of circumferential spacings one from another, the friction spring segments 38 can be of different widths and thicknesses. The friction spring segments 38 could also be of a coil shape or of a straight friction spring shape or one continuous circumferential segment that continuously extends from the retention band 37 as shown in FIG. 3 and discussed infra.

Figure 2:
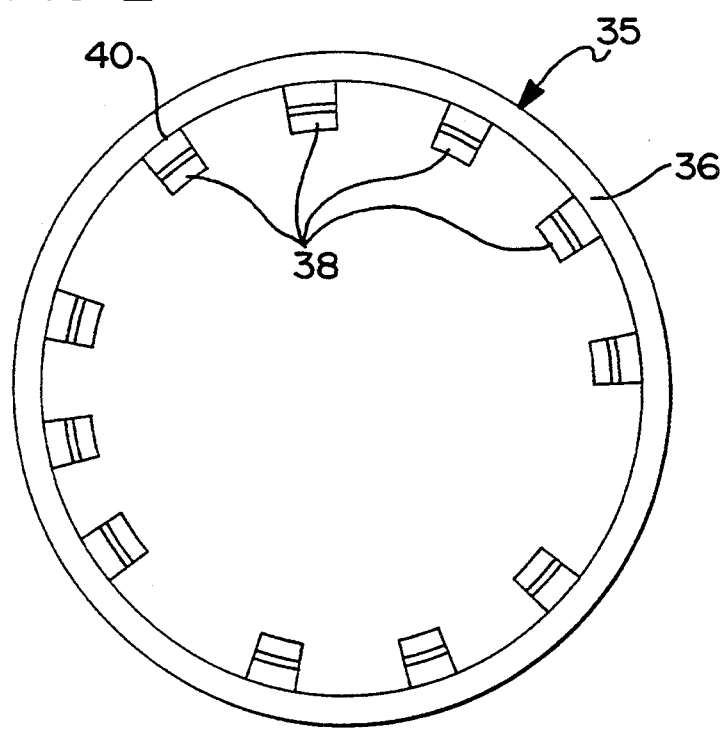
FIG. 2 is a front elevation view II—II of FIG. 1 of the brake squeal damper ring of the present invention.

Now referring to FIG. 2, sectional view II—II is of the damper ring 35 of FIG. 1 is shown where the plurality of friction spring segments 38 extend from the retention band 37. The material used for the retention band 37 and the friction spring segments 38 would preferably be an alloy steel such as that commonly used for springs and other applications which resist property transformation at the high temperatures that are commonly encountered in the brake operating environment. The friction spring segments 38 are formed so as to provide a high separation force on installation. Also, the friction spring segments 38 provide a high level of frictional damping of the brake drum assembly 18, especially at the squealer band 24, thereby reducing brake squeal noise level.

The friction spring segments 38 are attached to the retention band 37 at connection joint 40, for example, by welding or some other commonly known attachment method. This configuration allows for a higher spring rate for the friction spring segment 38 as compared to the prior art where the retention band 37 and the friction spring segment 38 would be formed from one piece by a bending operation with both the friction spring segments 38 and the retention band 37 being of the same thickness and material. One aspect of the present invention is that different materials and thicknesses can be used for the friction spring segments 38 as compared to the retention band 37 which allows for improved damping levels over a long time period of reduced cost.

The friction spring segments 38 extend from the squealer band 24 outward toward the wheel rim 28 where they are attached to the retention band 37. Where the friction spring segment 38 contacts the squealer retention band 24, the friction spring segment 38 is formed with a radius of curvature thereby creating a concavity that faces away from the squealer band 24 for ease of assembly and to allow for relative movement of the wheel 25 and the squealer band 24 without binding.

The damper ring 35 is comprised of a retention band 37 and a stop flange 36 which extends outward from the inner retention band 37. The inner retention band 37 contacts an inner surface of the wheel rim 28 and is positioned axially when the stop flange 36 contacts the bead section 30 of the wheel rim 28.

In combination, the retention band 37 and the attached friction spring segments 38 provide a device that effectively reduces brake squeal noise which is easy to manufacture and install. The combination is pushed into the opening between the brake drum 18 and the inside of the wheel 25.

The present invention reduces the vibration levels of the brake drum 18 with the insertion of a plurality of friction spring segments 38 forced between the brake drum 18 and the wheel 25 so as to add frictional damping. As shown in FIG. 2, equal or unequal circumferential spacing between the segments 38 can be utilized to obtain the most effective noise reduction level. The friction spring segments 38, which can be of varied widths and thickness, are joined together by the retention band 37 which serves to hold the friction spring segment 38 in position between the drum 18 and wheel 25 and also in spacial relation one to the other. This construction lends itself to inexpensive manufacturing and easy installation with a decreased likelihood of loss or failure due to movement of the friction spring segments 38. Also, by acting directly on the drum squealer band 24, the frictional damping is more effective in reducing brake squeal noise as compared to the prior art configurations.

The expansion force of the friction spring segments 38 also serve to hold the retention band 37 against the inside surface of the wheel rim 28 thereby holding the damper ring 35 in position. This particular structure permits a high spring force to be applied against the squealer band 24 while providing a secure mounting of the damper ring 35 to the wheel 25 and drum 22 assembly thereby maximizing the frictional damping and noise reduction.

Any number of friction spring segments 38 can be attached to the retention band 37 including one continuous annular friction spring segment 38 which would provide continuous contact with the brake drum squealer band 24 to provide for increased frictional damping. Referring to FIG. 3, an alternate embodiment is shown where a continuous annular friction spring segment 38' is shown which is segmented by a multiplicity of axial slots 42 extending from an end contacting the squealer band 24 inward approximately half the length of the friction spring segment 38 thereby providing additional frictional damping due to contact between the edge of the axial slots 42 and the squealer band 24.

Figure 4:
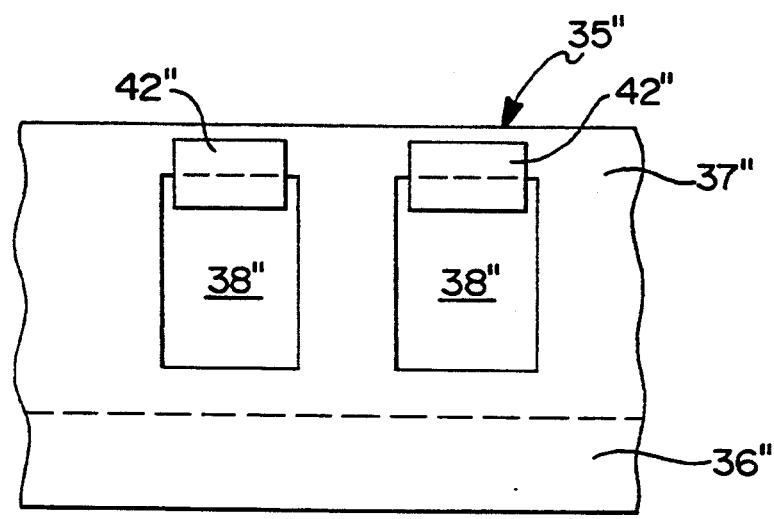
FIG. 4 is a fragmented view of a second alternate embodiment of the damper ring of the present invention.

FIG. 4 illustrates a second alternate embodiment where the damper ring 35" consisting of the retention band 37" and the friction spring segments 38" are formed from one stamping where the friction spring segments 38" are cut out of a section of flat stock, then bent into shape and then strengthened by adding a layer of metal as a cap 42" over the bead by spot welding. Thus, the friction spring segments 38" extend from and are integral with the retention band 37" and have metal caps 42" welded on the retention band 37" and the friction spring segments 38" to cover and strengthen a bead section at the transition between the friction spring segments 38" and the retention band 37". Likewise, the stop flange 36" is formed by bending the edge of the section into position.

Although this invention has been described in its preferred form with a certain degree of particularity, it is understood that the present disclosure of the preferred form has been made only by way of example only and that numerous changes in the details of construction and combination and arrangement of parts may be resorted to without departing from the spirit and the scope of the invention as hereinafter claimed.

We claim:

1. A vehicle brake assembly for reducing brake squeal comprising:

an annular brake drum having a flange and an outer surface and a squealer band connected to said outer surface;

a wheel having a hub mounted to said flange and an annular rim attached to said hub, said rim in annular spaced relation about said drum and having an inner surface spaced radially outward from said squealer band thereby establishing a gap area between said squealer band and said inner surface of said rim;

an annular damper ring disposed within said gap, comprised of an annular retention band contacting said inner surface of said rim; a stop flange outwardly radially extending from said retention band and contacting said rim to axially position said retention band and at least one friction spring is welded to said retention band and has a radius of curvature forming a concavity which faces away from said brake drum to establish a line of contact between said friction spring and said squealer band thereby imparting a separation force and frictional damping between said rim and said squealer band.

2. The vehicle brake assembly of claim 1 wherein a multiplicity of friction spring segments are formed from one annular friction spring by cutting axial slots into said friction spring to approximately 50 percent of the width of said friction spring.

3. A vehicle brake assembly for reducing brake squeal comprising:
an annular drum brake having a flange and an outer surface and a squealer band connected to said outer surface;
a wheel having a hub mounted to said flange and an annular rim attached to said hub, said rim in annular spaced relation about said drum and having an inner surface spaced radially outward from said squealer band thereby establishing a gap area between said squealer band and said inner surface of said rim;
an annular damper ring disposed within said gap, comprised of an annular retention band contacting said inner surface of said rim; a stop flange outwardly radially extending from said retention band and contacting said rim to axially position said retention band and at least one friction spring extending from and an integral piece with said retention band and having a metal cap welded on said retention band and said friction spring to cover and strengthen a bead section at the transition between said friction spring and said retention band and where said friction spring contacts said squealer band thereby imparting a separation force and frictional damping between said rim and said squealer band.

4. A brake squeal assembly comprising:
a wheel assembly including an annular brake drum having an outer surface with an annular squealer band attached thereto and a friction inner surface for reacting with a brake shoe and a rim secured to said wheel in annular spaced relation about said drum and having an inner surface spaced radially outward from said drum outer surface;
a squeal damper ring disposed between said rim and said brake drum said damper ring having a plurality of friction springs attached to an annular retention band contacting said inner surface of said wheel, said friction springs formed of thicker material than said retention band and extending to frictionally contact said squealer band to dampen vibration of said brake drum.

5. The brake squeal control assembly of claim 4, wherein a plurality of substantially parallel axial slots are formed in said friction springs where said friction springs contact said squealer band for increased frictional damping.

* * * * *